(12) United States Patent
Forbush

(10) Patent No.: US 11,040,341 B2
(45) Date of Patent: Jun. 22, 2021

(54) METHOD FOR DISPENSING DROPS OF DIFFERENT VOLUMES

(71) Applicant: Labcyte Inc., San Jose, CA (US)

(72) Inventor: Michael James Forbush, Hollister, CA (US)

(73) Assignee: Labcyte Inc., San Jose, CA (US)

( * ) Notice: Subject to any disclaimer, the term of this patent is extended or adjusted under 35 U.S.C. 154(b) by 522 days.

(21) Appl. No.: 15/886,744

(22) Filed: Feb. 1, 2018

(65) Prior Publication Data
US 2019/0232275 A1    Aug. 1, 2019

(51) Int. Cl.
*B01L 3/02* (2006.01)
*G01N 35/10* (2006.01)

(52) U.S. Cl.
CPC ........ *B01L 3/0268* (2013.01); *G01N 35/1016* (2013.01); *B01L 2200/148* (2013.01); *B01L 2300/0829* (2013.01); *B01L 2400/0436* (2013.01); *B01L 2400/0439* (2013.01); *G01N 2035/1041* (2013.01)

(58) Field of Classification Search
None
See application file for complete search history.

(56) References Cited

U.S. PATENT DOCUMENTS

| | | | | |
|---|---|---|---|---|
| 6,029,896 | A * | 2/2000 | Self | B05B 17/0607 239/4 |
| 6,155,671 | A * | 12/2000 | Fukumoto | B41J 2/14008 347/46 |
| 6,863,362 | B2 | 3/2005 | Reichel et al. | |
| 7,661,289 | B1 | 2/2010 | Jhutty et al. | |
| 10,112,212 | B1 | 10/2018 | Stearns et al. | |
| 2003/0081040 | A1 * | 5/2003 | Therien | B41J 2/125 347/19 |
| 2006/0144871 | A1 * | 7/2006 | Van Tuyl | G01N 29/343 222/420 |
| 2011/0121021 | A1 * | 5/2011 | Dudenhoefer | B41J 2/0458 222/1 |
| 2013/0273591 | A1 * | 10/2013 | Attinger | B01L 3/502784 435/30 |

OTHER PUBLICATIONS

Angelo DePalma, Acoustic Liquid Handling:: Using Sound to Dispense Liquids, https://www.labmanager.com/product-focus/2017/07/acoustic-liquid-handling-using-sound-to-dispense-liquids#.XKv5FaR7m00, Jul. 13, 2017.

* cited by examiner

*Primary Examiner* — Jill A Warden
*Assistant Examiner* — Brittany I Fisher
(74) *Attorney, Agent, or Firm* — Kilpatrick Townsend & Stockton LLP

(57) ABSTRACT

A method that allows a user to dispense a desired volume of solution from an acoustic dispensing apparatus by allowing the user to select the drop volume to be dispensed. A typical drop volume is in the range of one to twenty-five nanoliters. The method comprises the steps of creating two or more burst curves that give the relationship between liquid level and burst value, using data from the burst curves to create two or more calibration functions, and using data from the calibration functions to create a dispensing data set that is used to set the burst parameter required to dispense the selected drop volume.

16 Claims, 5 Drawing Sheets

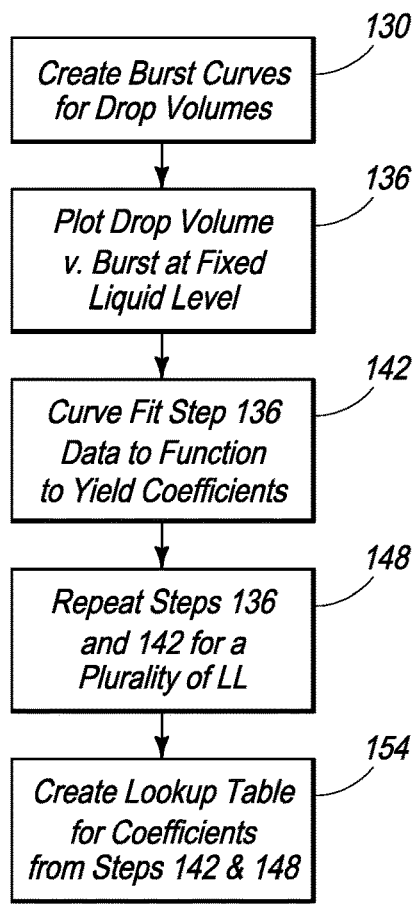
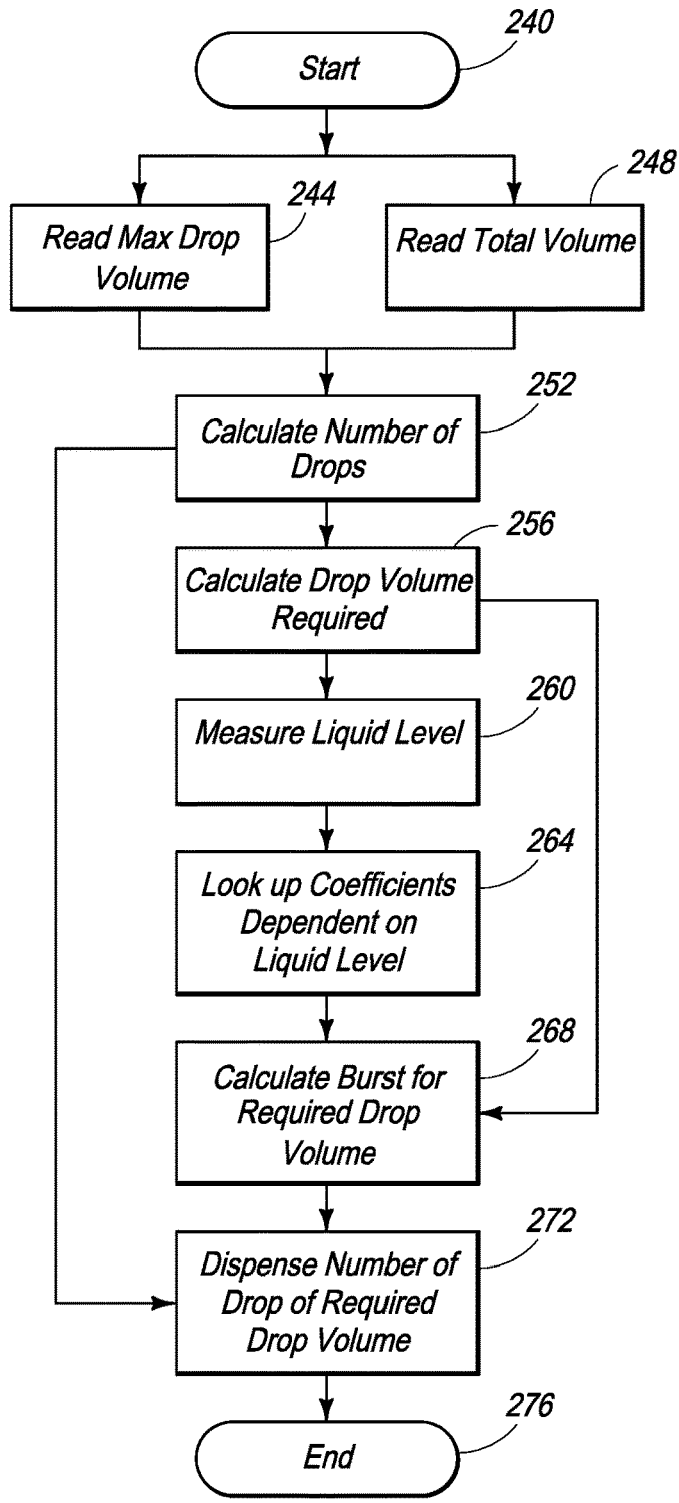
Fig. 3
Fig. 10

METHOD FOR DISPENSING DROPS OF DIFFERENT VOLUMES

BACKGROUND OF THE INVENTION

Acoustic dispensing is a well-known method for dispensing very small volumes of liquid, for example in the range of one nanoliter to one microliter. Generally, multiple drops (sometimes called droplets) having a fixed volume are ejected from an acoustic dispensing apparatus to yield the total volume of liquid that is desired. This methodology is used because the acoustic dispensing apparatus must be carefully calibrated to dispense a specific drop volume, making it time consuming to change the volume of the drop. The inability to freely select the volume of a drop creates several problems. For example, it limits the final dispense volume to multiples of the selected drop volume, and it results in a longer dispense time if the size of the drop is small. Nonetheless, this is the current state of acoustic dispensing using technology such as that discussed below.

FIG. 1 illustrates an acoustic drop dispensing apparatus 10 known in the prior art. Apparatuses of this type are capable of dispensing drops of liquids having volumes as small as approximately one hundred picoliters, and are particularly useful in the biotechnology and biopharmaceutical fields. A representative acoustic drop dispensing apparatus is described in U.S. Pat. No. 6,863,362 which is incorporated herein by reference.

In the apparatus 10, an acoustic wave emitter 14 (such as a piezoelectric crystal) is in electrical communication with a computer 18. During operation the acoustic wave emitter 14 generates an acoustic wave or beam 20 that can be propagated through an optional wave channel 24. The acoustic wave can be focused by a lens 28 prior to propagating through a coupling medium 32 to optimize the energy of the acoustic wave or beam 20 upon the liquid/air interface (free surface) of a source liquid 40. The assembly comprised of the acoustic wave emitter 14, the wave channel 24 and the lens 28 is referred to as an acoustic emitter assembly 29. The acoustic wave 20 is propagated through the coupling medium 32 after which the wave is transmitted through a source liquid containment structure 44 where the wave comes to focus at or near the surface of the pool of source liquid 40, thereby causing a drop 60 of the source liquid 40 to be dispensed from the surface of the pool.

Examples of source liquid containment structures 44 include single and multi-well wellplates commonly used in molecular biology applications, capillaries (e.g., capillary arrays), and the like. However, other containers or structures may be used to hold the liquid 40 to be dispensed or ejected. A typical wellplate comprises a matrix (rows and columns) of individual wells 46. Typical commercially available wellplates have 96, 384, 1536 or 3456 individual wells. The source liquid 40 may be contained in some or all of these wells 46 and the composition of the source liquid in individual wells may differ from well to well (i.e. there can be multiple source liquids 40). Furthermore, the volume of source liquid in the individual wells may differ from well to well. The volume of source liquid in an individual well is derived from the liquid level and well geometry.

Optimally, to dispense one or more drops from one of the individual wells 46, the well 46 must be positioned over the acoustic wave emitter 14. To accomplish this, the source fluid containment structure 44 is detachably affixed to a gripper 49. The gripper 49 is controlled by an actuator mechanism 50 which contains a horizontal actuator 54 for moving the containment structure 44 in the horizontal (x and y) directions. A vertical actuator 58 moves the acoustic wave emitter 14 and wave channel 24 in the vertical (z) direction. The actuator 50 is typically in communication with computer 18 which controls the movement of the containment structure 44 to select a source liquid 40 or to adjust focusing of the acoustic wave or beam 20 at or near the surface of the source liquid 40. The computer may have implemented thereon various algorithms to adjust the focal position and energy of the acoustic wave emitter as well as control and manage the location of the acoustic wave emitter relative to a source fluid present in or on a source fluid containment structure.

Accordingly, the apparatus 10 may be used to cause one or more drops 60 of the source liquid 40 to be dispensed from the containment structure 44 and towards a target substrate 70, as is described in U.S. Pat. No. 6,863,362. The target substrate 70 may be a multi-well wellplate like the source fluid containment structure 44, or may be some other type of medium. Generally, one or more horizontal actuators 59 are provided for moving the target substrate 70 in the horizontal (x and y) directions. A typical wellplate that could be used as the target substrate 70 may have 96, 384, 1536 or 3456 individual target wells 74, or some other number of target wells. FIG. 2 illustrates the target wells 74 in a wellplate used as the target substrate 70.

In many cases, a piezoelectric transducer is employed as an acoustic wave emitter 14. For example, the piezoelectric transducer may comprise a flat thin piezoelectric element, which is constructed between a pair of thin film electrode plates. As is understood by those of skill in the art, when a high frequency and appropriate magnitude voltage is applied across the thin film electrode plates of a piezoelectric transducer, radio frequency energy will cause the piezoelectric element to be excited into a thickness mode oscillation. The resultant oscillation of the piezoelectric element generates a slightly diverging acoustic beam of acoustic waves. By directing the wave or beam onto an appropriate lens having a defined radius of curvature (e.g., a spherical lens, or the like), the acoustic beam can be brought to focus at a desired point.

Generally, a computer sends an analog voltage pulse to the piezoelectric transducer by an electrical wire 78. The electronics can control the magnitude and duration of the analog voltage pulses, and the frequency at which the pulses are sent to the piezoelectric transducer. Each voltage pulse causes the generation of an acoustic wave from the piezoelectric transducer, which in turn is propagated through a coupling medium and into or through the source fluid thereby impinging on the surface of the source fluid. A series of cycles of acoustic waves and one "off" period after the generation of the acoustic waves (corresponding to an interval between voltage pulses) is referred to as one "burst."

A problem encountered in using acoustic drop dispensing systems, such as the apparatus 10, is that it is difficult to precisely control the volume of the drops dispensed from the apparatus. In large part, this is because many parameters associated with the source liquid, such as chemical composition, viscosity, temperature, speed of sound in the liquid, etc., affect the size (volume) of the drop. Furthermore, the liquid level of the source liquid in the well 46 also affects the size (volume) of the drop. Additionally, other factors, such as the geometry of the source well (e.g. well shape, well bottom thickness, etc.) or the manufacturing variability of the acoustic emitter assembly 29, can influence the size of the drop. To deal with this problem, the acoustic drop dispensing apparatus 10 needs to be calibrated so that uniform drop volume can be achieved. A method for calibrating the apparatus 10 is described in U.S. Pat. No. 7,661,289 which is incorporated herein by reference.

As was mentioned previously, the inability to freely select the volume of a drop to be dispensed limits the final dispense volume to multiples of the selected drop volume, and results in a longer dispense time if the size of the drop is small. What is needed is the ability to select and dispense drops of any volume within a reasonable range of drop volumes. This would allow the drop volume to be optimized based on the final volume of source solution to be dispensed. In other words, fewer drops of larger volume could be used to accomplish the dispense volume, and the user could choose the dispense volume that is desired.

SUMMARY OF THE INVENTION

Briefly, the present invention is an acoustic dispensing method that allows the user to select the final total volume of solution to be dispensed. The method creates the most efficient drop volume calibration needed for dispensing by the acoustic dispensing apparatus. The user can also manually select the drop volume that allows the dispense time to be minimized because the volume of the drops can be chosen to minimize the number of drops that need to be dispensed to yield the final total volume.

The method comprises the steps of creating two or more burst curves that give the relationship between liquid level and burst value, using data from the burst curves to create two or more calibration functions, and using data from the calibration functions to create a dispensing data set that is used to set the burst parameter required to dispense the selected drop volume. In a typical procedure, the user determines the number of drops needed to dispense the desired volume of solution, calculates the required drop volume, uses the liquid level of the solution to select the burst parameter from the dispensing data set, and dispenses the drops.

BRIEF DESCRIPTION OF THE SEVERAL VIEWS OF THE DRAWINGS

FIG. 3 is a flow chart according to the present invention;

FIG. 10 is a flow chart illustrating a method of using the present invention.

DETAILED DESCRIPTION OF THE INVENTION

The present invention is a method that allows a user to select any drop volume within a specified range for dispensing by the acoustic dispensing apparatus 10. Among other things, the ability to select the drop volume allows the dispense time to be minimized because the volume of the drops can be chosen to minimize the number of drops needed to yield the total volume that needs to be dispensed. It also gives the user more freedom in selecting the total volume to be dispensed, because the dispensing process is no longer limited to one or two drop sizes.

The ability to select the drop volume is accomplished through a procedure that creates two or more calibration functions that relate drop volume to burst over a range of liquid levels in a containment structure, such as a well in a wellplate. In the preferred embodiment, the calibration function is generated through a multiple part method, whose endpoint is a dispensing data set allows the burst needed to produce the desired drop volume to be set. FIG. 3 is a flow chart that summarizes the sequence of steps used in generating the dispensing data set that allows a user to choose any drop volume within a selected range for dispensing by the acoustic dispensing apparatus 10.

Figure 4:
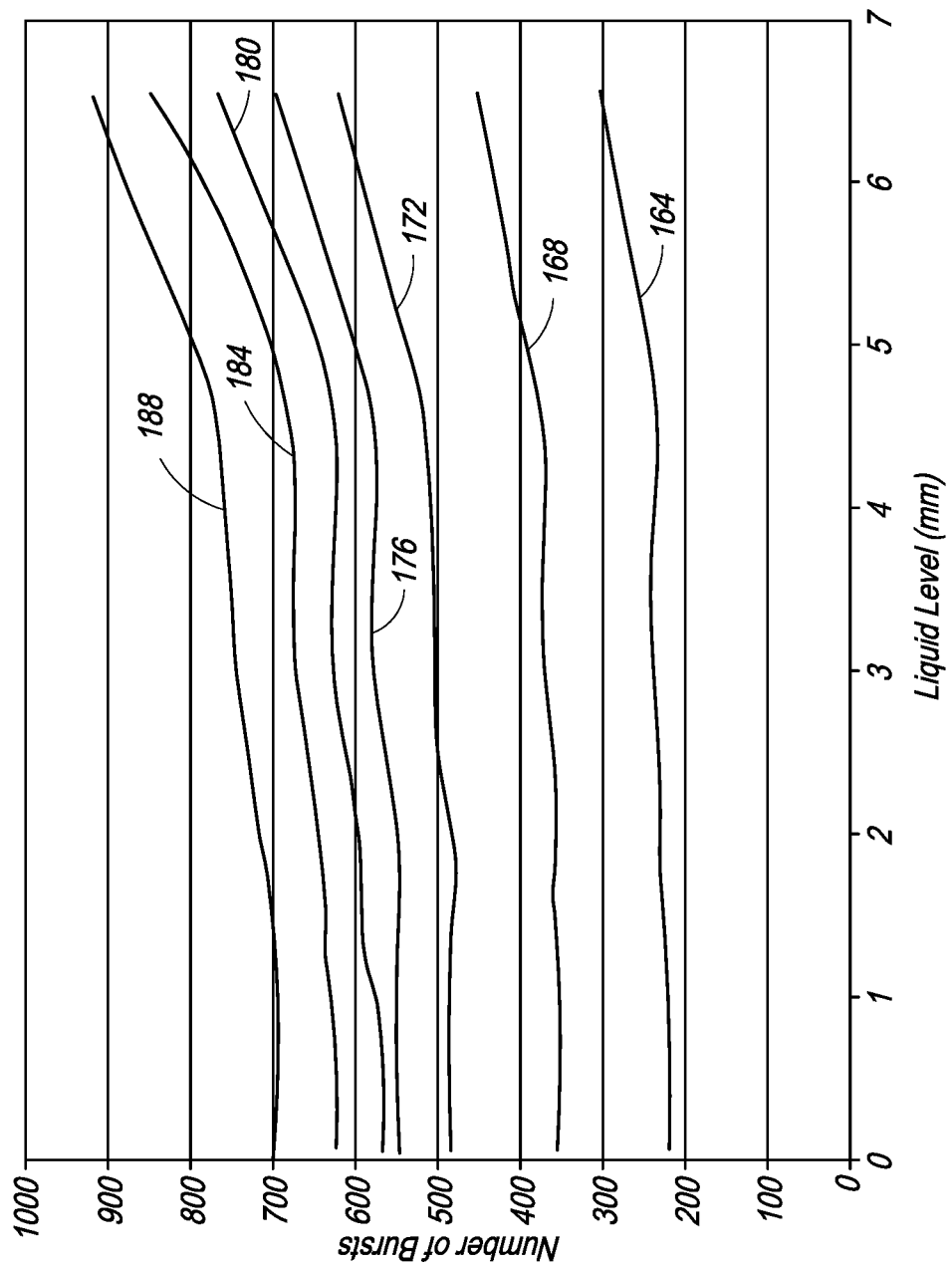
FIG. 4 is a plurality of burst curves.

Step 130 in FIG. 3 illustrates the first step in the procedure for generating the calibration functions. In step 130, a series of burst curves are derived for a range of drop volumes. A burst curve is a plot of liquid level versus burst value for a fixed drop volume. In a representative calibration procedure, the data for a plurality of burst curves is collected for a plurality of drop volumes. For example, FIG. 4 illustrates a set of seven burst curves for seven different drop volumes, such as 2, 4, 6, 7, 8, 9, and 10 nanoliters. In the preferred embodiment, the burst curves are generated as part of the calibration procedure used in a commercially available acoustic dispensing apparatus, and are discussed later in this patent application.

Figure 5:
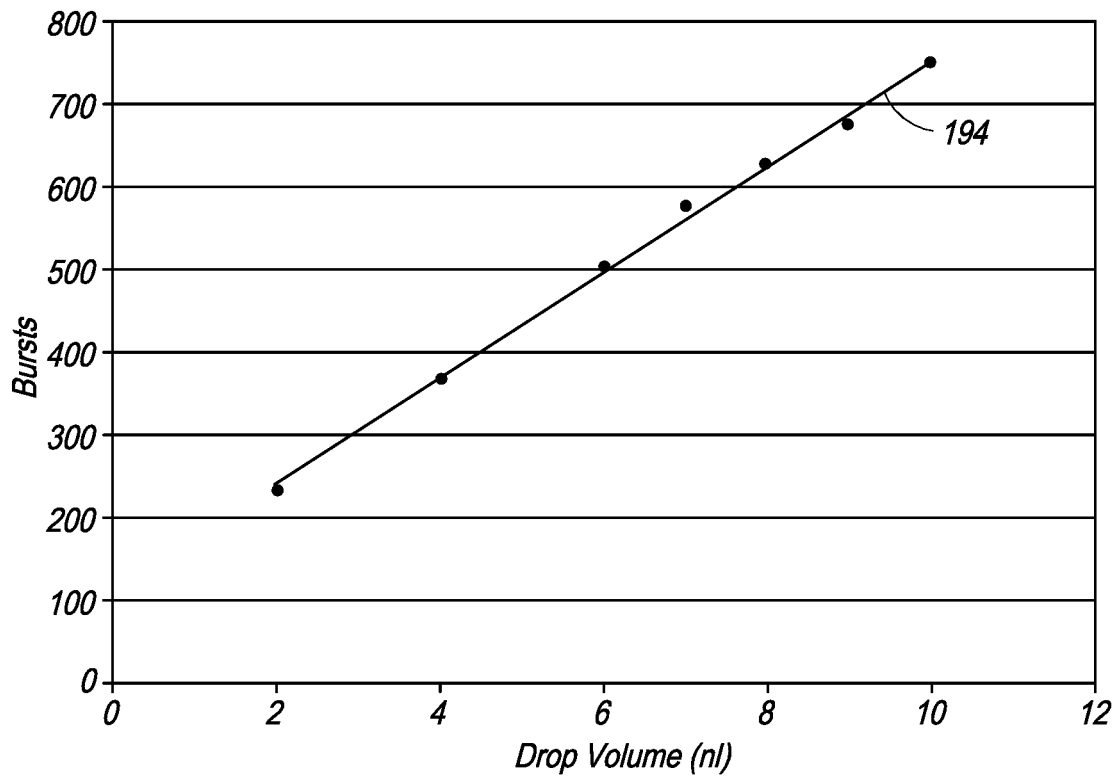
FIG. 5 is a graph of a calibration function according to the present invention.

In step 136, for a fixed liquid level value (e.g. 3.01 mm), drop volume versus burst parameter is plotted for the drop volumes used in the first step 130 (seven drop volumes in this example). In other words, by using the burst curves from FIG. 4 and step 130, the burst value for each of the drop volumes is extracted from the burst curve at the fixed liquid level, and plotted versus drop volume, as is illustrated in FIG. 5. Step 142 illustrates that the data from step 136 is fitted to a function, referred to as the calibration function, that can be used to determine the burst value needed to produce a selected drop volume of any size at the specified liquid level.

In the preferred embodiment, the function that results from step 142 is the equation for a straight line relating drop volume to burst value for a given liquid level. Therefore, the slope and intercept of this function can be used to calculate the burst value needed to produce any selected drop volume at the specified liquid level. The curve fitting process can be accomplished by several methods. For example, commercial software like Microsoft's Excel spreadsheet can be used, as can National Instruments' LabVIEW math functions software. Alternatively, a curve fitting routine, like a least squares fitting routine, can be custom written and compiled in a computer language like C++.

FIG. 5 illustrates the graph generated in steps 136 and 142 using the data from FIG. 4 at the liquid level of 3.01 mm, and shows the calibration function 194 as a straight line. In other embodiments, the calibration function may not be a straight line (i.e. the calibration function might be a curve), and a higher degree polynomial would be required for an acceptable the curve fit.

Step 148 indicates that in the preferred embodiment, a plurality of calibration functions is needed for a plurality of liquid levels (e.g. 36 calibration curves for 36 liquid levels). The plurality of calibration functions is generated by repeating steps 136 and 142 for the plurality of liquid levels, thereby yielding a plurality of different calibration functions analogous to the calibration function 194 shown in FIG. 5.

Step 154 indicates that each of the plurality of different calibration functions has a slope and intercept (or other coefficients) that can be used to calculate the burst needed to produce any selected drop volume over the range of liquid levels. A lookup table (called the dispensing data set) is created in step 154 for storing the slope and intercept and any other relevant information as a function of liquid level.

Figure 6:
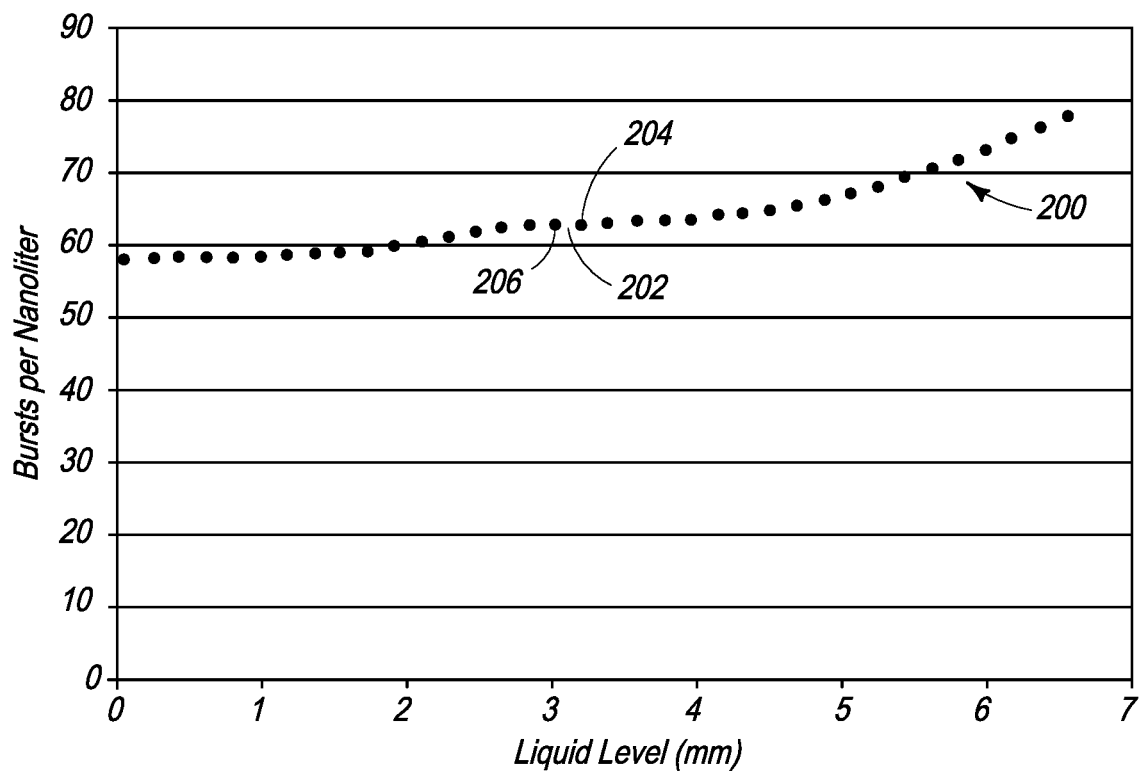
FIG. 6 is a graph of the slopes of a plurality of calibration functions according to the present invention.
Figure 7:
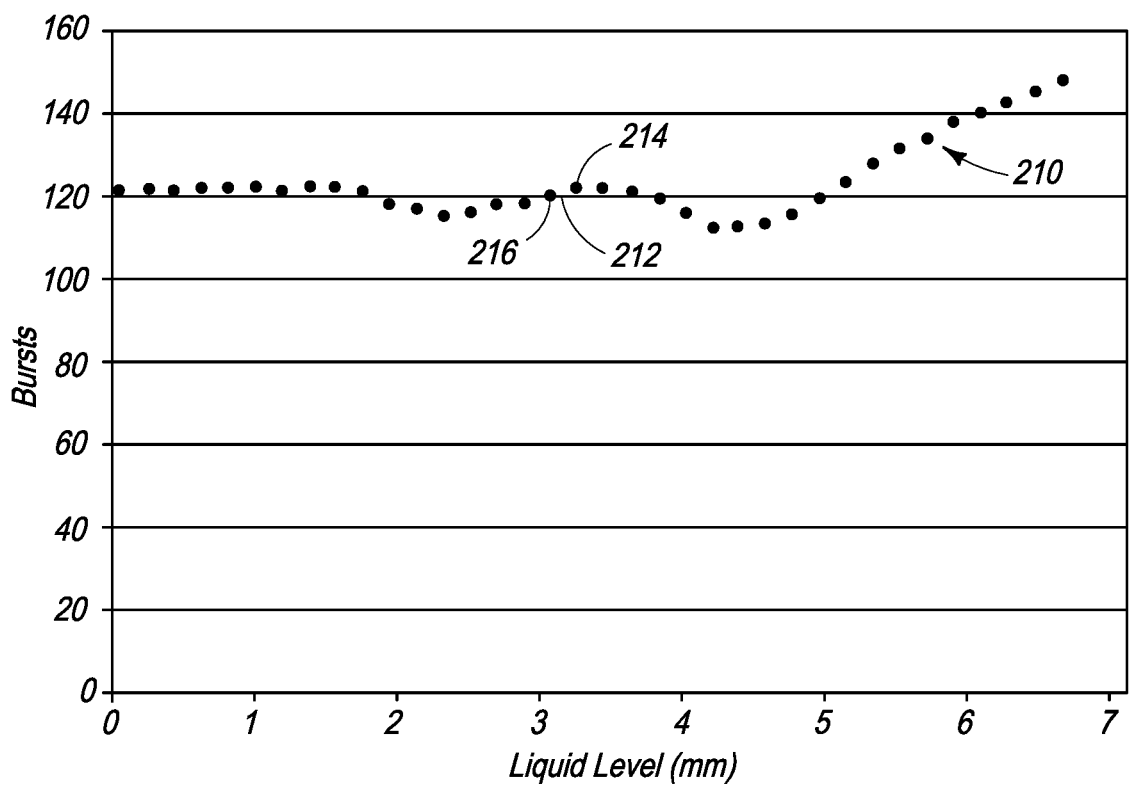
FIG. 7 is a graph of the intercepts of a plurality of calibration functions according to the present invention.

FIGS. 6 and 7 show the results of Step 154 in graphical form. FIG. 6 illustrates the individual values for the slopes of the plurality of calibration functions plotted over the range of liquid levels from 0.05 to 6.54 millimeters, and FIG. 7 illustrates the individual values for the intercepts of the plurality of calibration functions plotted over this range of liquid levels. The data contained in FIGS. 6 and 7 can be used to calculate the burst value needed to produce any selected drop volume over the range of liquid levels, as is explained later.

Figure 1:
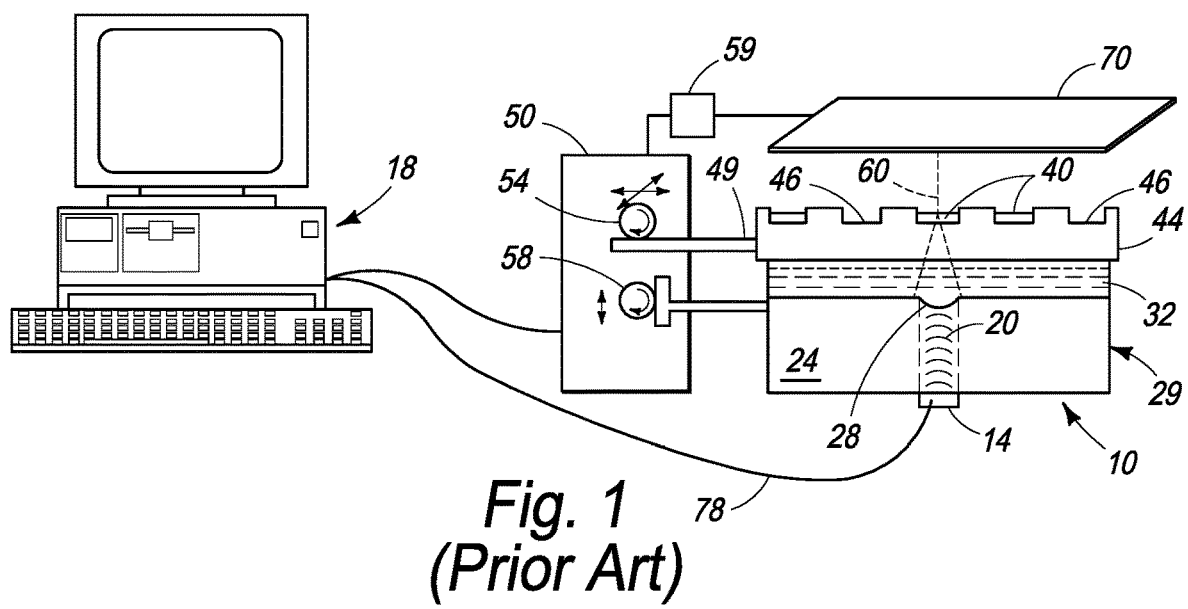
FIG. 1 is a schematic diagram of an acoustic drop dispensing apparatus of the prior art.
Figure 2:
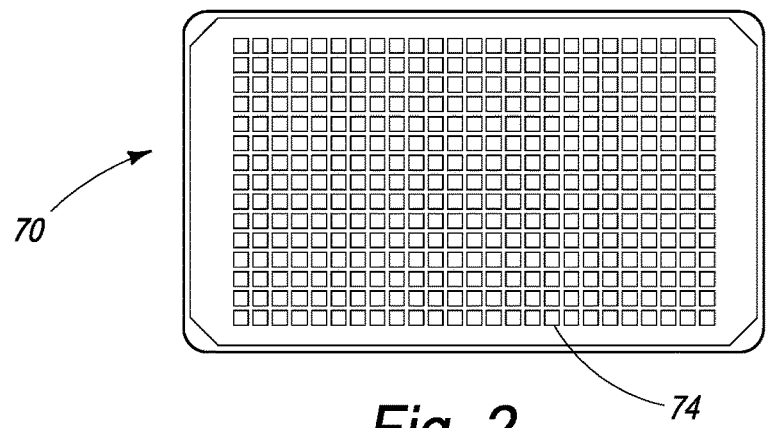
FIG. 2 is a top view of a wellplate of the prior art.

In a preferred embodiment, the data in FIG. 4 was generated using a Gen 5 ATS acoustic dispenser from EDC Biosystems of Fremont, Calif. The Gen 5 ATS acoustic dispenser is similar to the acoustic dispensing apparatus 10 shown in FIG. 1, and in the discussion below, the components of the acoustic dispenser 10 shown in FIG. 1 are used to describe the Gen 5 ATS acoustic dispenser.

The seven burst curves shown in FIG. 4 show what burst value must be used in the acoustic dispenser 10 to dispense the specified drop size (volume) over a range of liquid levels. A burst is a series of acoustic waves followed by a period of rest, such as an "off" period after the generation of the acoustic waves. The off period corresponds to an interval between voltage pulses applied to the acoustic wave emitter 14 that cause the acoustic waves to be emitted. Therefore, a series of bursts is proportional to the length of time that an acoustic signal is applied to a source liquid. In other words, the amount of energy being applied to the surface of the liquid is proportional to both the strength of the acoustic wave and the length of time that those acoustic waves are being applied. In this application, the terms burst, burst value, and burst parameter are used interchangeably.

In order to generate a burst curve, the apparatus 10 must be calibrated to determine what burst will yield a specific drop volume at various liquid levels in the source well. In the preferred embodiment, a method for generating burst curves such as the one described in U.S. Pat. No. 7,661,289, is used. In other embodiments, other methods could be used. In general, the calibration procedure involves using the apparatus 10 to dispense drops of a solution containing a dye, such as a fluorescent dye, into target wells, and then calculating the drop volume that was dispensed by comparison to a standard having a known concentration of the fluorescent dye. This process is repeated for a plurality of liquid levels, and then the data is processed to yield the burst curve showing what burst is required to produce a drop of a given volume as a function of liquid level (i.e. as a function of the height of the source liquid in a well or some other container).

Once an acceptable burst curve is obtained, it can be further processed to yield a fine tuned burst curve. Fine tuning is done by selecting the burst settings from a burst curve for a particular drop volume, and then using the settings to dispense a dye solution, such as fluorescein dye in a DMSO solution, onto a target plate using the apparatus 10. The fluorescent counts versus liquid level are then plotted and compared to the fluorescent counts expected based on the selected drop size. The burst values for each liquid level are then changed until the fluorescent counts are roughly uniform over the range of liquid levels, indicating that a uniform (and accurate) drop size is being dispensed at each liquid level. A calibration is considered finely tuned when the relative standard deviation is less than 5% along the range of liquid levels. The mean value of the data is used as the actual drop volume dispensed in the process.

Figure 8:
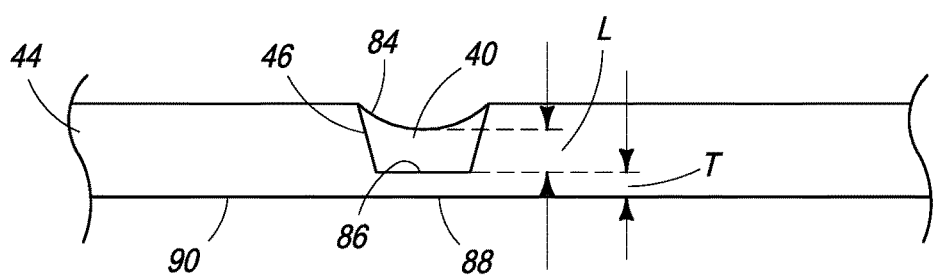
FIG. 8 is a cross sectional view of a well in a wellplate.

FIG. 8 illustrates that the liquid level "L" of the source liquid 40 in the source well 46 is the height of the free surface of the liquid 40 above the bottom of the well 46. Generally, L is the distance between the lowest part of the meniscus 84 of the liquid 40, and a well bottom surface 86 of the well 46 that is in contact with the liquid 40. However, other reference points could be used as the liquid level.

FIG. 8 also illustrates that the wellplate 44 has a thickness "T" underneath the well bottom surface 86. The wellplate 44 has a wellplate bottom surface 88. In the preferred embodiment, liquid level is measured by the acoustic dispenser 10, such as by measuring the time it takes for an acoustic wave to make a round trip from the acoustic wave emitter 14 to the surface of the source liquid 40 (i.e. the meniscus 84), called t1, and subtracting out the time it takes for an acoustic wave to make a round trip to the bottom surface 86 of the well, called t2. The liquid level (LL) is then calculated using a calculation such as $LL=v(t1-t2)/2$, where v is the speed of sound in the liquid 40, as is explained in U.S. Pat. No. 7,661,289. However, other methods of measuring liquid level could be used.

Referring to FIG. 4, seven finely-tuned burst curves are shown for seven different drop volumes of a 90% DMSO/10% water/100 μM fluorescein solution. These curves are labeled 164, 168, 172, 176, 180, 184, and 188, and correspond to drop volumes of 2 nanoliters, 4 nl, 6 nl, 7 nl, 8 nl, 9 nl, and 10 nl, respectively. In practice, since this calibration procedure is implemented in software, the data for the burst curves are stored as a calibration files in electronic memory (usually on a hard disk and in RAM).

A calibration file is created for each drop volume (i.e. seven calibration files in this example), and each calibration file comprises a look up table that lists a variety of parameters required to dispense the given drop volume. These parameters include the drop volume, focus, voltage, and burst for each of thirty-six liquid levels. In the preferred embodiment, the focus and voltage are held constant, so only the burst varies with liquid level. In other embodiments, the focus and voltage could be varied, and other parameters could be included. The calibration files are referred to as burst curve data sets in other parts of this application.

FIG. 5 utilizes the data shown in FIG. 4, and shows seven burst values, one burst value for each drop volume, plotted against the drop volume for a single liquid level (e.g. 3.01 mm in this case). In other words, FIG. 5 is generated by going to FIG. 4 and reading the burst value at 3.01 mm for each of the seven drop volumes. (In practice, this information would be extracted from the calibration files for the burst curves). In the preferred embodiment, the data in FIG. 5 are subjected to a curve fitting process, which in this case yields a straight line referred to as a calibration function 194. Additionally, in the preferred embodiment two or more new calibration functions are generated in the same way that the calibration function 194 was generated, except that a new liquid level (and the corresponding new burst values) is used to generate each of the new calibration functions. For example, in FIG. 6 below, a total of thirty-six calibration functions were generated and subjected to a curve fitting process.

The equation that results from the curve fitting process for the calibration function 194 is a linear equation that relates drop volume to burst value for a given liquid level. Therefore, the slope and intercept of the function 194 can be used to calculate the burst value needed to produce any selected drop volume at the specified liquid level. A least squares analysis of the data in FIG. 5 yields a coefficient of determination ($R^2$) of 0.9966, indicating a very good fit of the data to the straight line (calibration function 194). In other embodiments, the calibration function may not be a straight line (i.e. the calibration function might be a curve), and a polynomial having a degree higher than one (e.g. 2-10) would be required for an acceptable the curve fit.

FIG. 6 shows the slopes for thirty-six calibration functions plotted against liquid level. The thirty-six calibration functions were generated in the same way that the calibration function in FIG. 5 was generated. Specifically, the burst value for each of the seven drop volumes in FIG. 4, is plotted against the drop volume for a single liquid level, calculating the slope and intercept of the resulting line, and then plotting the slope versus the liquid level to yield one of the data points in FIG. 6. This is repeated thirty-five additional times to yield the results shown in FIG. 6. A curve 200 may be drawn that connects all of the thirty-six data points in FIG. 6. FIG. 7 shows the intercepts for the thirty-six calibration functions plotted against liquid level. A curve 210 may be drawn that connects all of the thirty-six data points in FIG. 7.

The data contained in FIGS. 6 and 7 can be used to calculate the burst value needed to produce any selected drop volume over the range of liquid levels. For example, Equation 1 can be used to calculate the required burst value:

$$\text{Required burst}=(\text{slope})(\text{desired drop vol.})+\text{intercept} \qquad (1)$$

where the slope and intercept are obtained from FIGS. 6 and 7, and the user measures the liquid level and chooses the desired drop volume.

In a preferred embodiment, once a liquid level is measured and a desired drop volume has been selected, then the defined function for the point higher in the liquid level and the next point lower in the liquid level may be determined. The value for the actual point is determined by interpolation to the point measured and the proper burst value is acquired. For example, if the liquid level was measured at the point 202 on the curve 200, then the slopes for points 204 and 206 in FIG. 6 would be determined, and the slope for point 202 would be determined by interpolation between these two burst values. Similarly, the intercept for the point 212 in FIG. 7 (at the measured liquid level) would be determined by interpolation between the points 214 and 216. The interpolated values for the slope and intercept are then used in equation one to get the required burst for the new drop volume.

FIGS. 6 and 7 show the results of plotting two coefficients, slope and intercept, for a linear calibration function, such as the calibration function 194 obtained in FIG. 5. However, if the calibration function 194 was not a straight line, a higher degree polynomial would be required to fit the data to a curve. This higher degree polynomial would have additional coefficients that would be plotted in the same manner that the slope and intercept in FIGS. 6 and 7 were plotted.

In a preferred embodiment, the present invention is implemented in software, so all of the data from the FIGS. 6 and 7 are stored in a lookup table in electronic memory. The lookup table lists liquid level, slope, intercept, higher degree coefficients (if any), and any other desired information (such as constants) in separate columns. Subsequently, an algorithm extracts the required data from the lookup table to yield the burst value needed to yield the specified drop volume at a given liquid level.

A preferred embodiment of the method for using the present invention to dispense drops of source fluid 60 having any volume within a defined range is as follows: In a first step, a first burst curve data set 164 is created (e.g. using the apparatus 10) that relates a range of liquid levels (FIG. 4, x-axis) of a source liquid 40 to a range of burst values (FIG. 4, y-axis) for dispensing one or more drops of the source liquid having a first drop volume (e,g, 2 nl), with the burst values being related to a plurality of acoustic waves 20. In FIG. 4, thirty-six reading at 36 liquid levels were used to create the burst curve 164, so all of these data points are included in the term "first burst curve data set." The phrase "burst values being related to a plurality of acoustic waves" means that burst is a series of acoustic waves followed by a period of rest.

In a second step, a second burst curve data set 188 is also created that relates the range of liquid levels to the range of burst values for dispensing one or more drops of the source liquid having a second drop volume (e.g., 10 nl), where the second drop volume is not equal to the first drop volume. More burst curve data sets (i.e., a plurality) could be created, such as the seven burst curves shown in FIG. 4, but two burst curve data sets are the minimum if the calibration function is going to be a straight line.

In general, the defined range of drop volumes that can be dispensed using the present invention is approximately determined by the range of drop volumes used to create the burst curve data sets, which is 2 nl to 10 nl in this example. However, in other cases other ranges of drop volumes could be used. Frequently, the properties of the source solution being dispensed will influence the range of drop values selected. A preferred range of drop values is 1 nl to 25 nl. Additionally, in some cases, the defined range of drop volumes could be expanded outside of this range used to create the burst curve data sets, if the accuracy in the drop volumes produced outside of the range is acceptable.

In a third step, a first calibration function data set 194 that relates the first drop volume (2 nl) to a first burst value measured at a first liquid level (3.01 mm in FIG. 5) in the first burst curve data set, and that relates the second drop volume (10 nl) to a second burst value measured at the first liquid level in the second burst curve data set.

In a fourth step, a second calibration function data set is created that relates the first drop volume to a third burst value measured at a second liquid level in the first burst curve data set, and that relates the second drop volume to a fourth burst value measured at the second liquid level in the second burst curve data set. Here, the second liquid level is a liquid level not equal to the first liquid level. More calibration function data sets (i.e., a plurality) could be created, such as the thirty-six calibration function data sets used in FIG. 6, but two calibration function data sets are the minimum that would work in the present invention. The more calibration function data sets that are created, the better the usefulness of the invention.

In a fifth step, a dispensing data set created from the first and second calibration function data sets is used to calculate a first new burst value required to dispense one or more drops of the source liquid having a first new drop volume, where the first new drop volume is different from both the first drop volume and the second drop volume. In a preferred embodiment, the first new burst value is calculated using the method described previously with respect to the points 202 and 212 in FIGS. 6 and 7, respectively. In the preferred embodiment, the first and second calibration function data sets are processed to yield two lines (i.e. two equations for lines), and the slopes and intercepts of these two lines are used in the dispensing data set. In other embodiments, the first and second calibration function data sets are processed to yield two polynomials having a degree higher than one, or some other type of equations that describe more complex curves, and the coefficients from these two polynomials, or from the other equations, are used in the dispensing data set.

An important advantage of creating new volume calibrations on the fly is the ability to create a final dispense volume more efficiently (i.e. faster) by using the largest drop volume possible. In general, the most efficient method for achieving a final dispense volume (i.e. the total volume dispensed by a plurality of drops), is to use the largest drop volume that can be multiplied by an integer to yield the final dispense volume. In considering this issue, it should be recognized that minimum resolution for dispensing a drop is one burst. It is known that there are about 60 bursts per nanoliter of solution. This resolution corresponds to less than 2% of a one nanoliter dispense (i.e. 1/60 of a nanoliter is approximately 2%).

Figure 9:
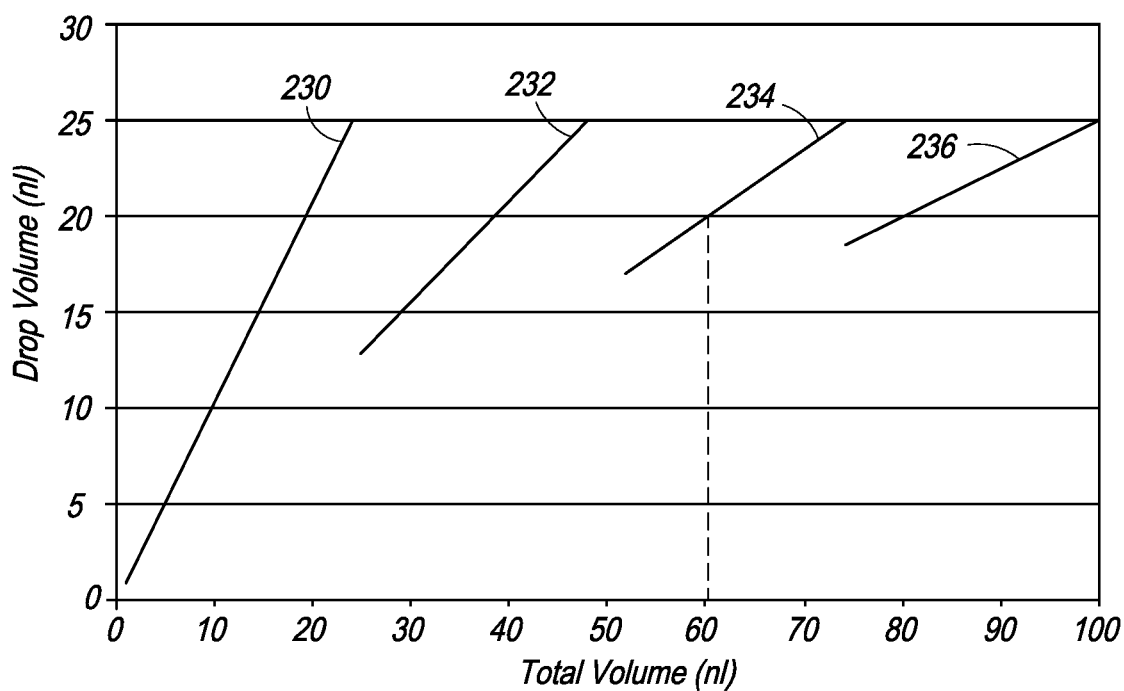
FIG. 9 is a graph illustrating the drop volume required to dispense a requested volume.

To illustrate these advantages, FIG. 9 shows the drop volume required for a final dispense volume in the range of 0 to 100 nl, where the maximum drop size is 25 nl and the minimum drop size is 1 nl. The major point in FIG. 9 is that for any volume between 1 nl and 100 nl, a maximum of four drops is required to deliver the final dispense volume. For example, looking at 60 nl along the x-axis in FIG. 9, and reading up until the line 234 is intersected, shows that a drop volume of 20 nl is the required drop size (3×20 nl=60 nl).

The information conveyed by FIG. 9 is important because it takes about 30 milliseconds to dispense a drop, so it would take about 2.94 seconds (98×30 msec) to dispense 99 nl of solution as 1 nl drops. In contrast, if 99 nl are dispensed using four drops of 24.75 nl, as can be done with the present invention, is only 0.09 seconds (3×30 msec). So, the method of the present invention improves (reduces) the time required to dispense a volume of solution, and also improves the resolution of the final dispense volume.

FIG. 10 illustrates how a user of the acoustic dispensing apparatus 10 would use a preferred embodiment of the present invention to dispense a volume of source fluid. In step 244, the user specifies the maximum drop volume that can be used. In step 248, the user specifies the volume of source fluid that should be dispensed (in a single well). In step 252 the number of drops to be used to dispense the total volume from step 248 is calculated. In the preferred embodiment, Equation 2 is used for this, but other equations are acceptable. Additionally, the user can manually select and/or decide on the number of drops to be dispensed.

$$\text{Total number of drops} = \text{integer}(\text{total volume}/\text{maximum drop volume}) + 1 \quad (2)$$

In this Equation 2, the one extra drop is used to ensure that the maximum drop volume isn't exceeded.

In step 256, the volume of the individual drops is automatically calculated, such as by dividing the volume to be dispensed by the number of drops. In step 260, the liquid level in the source well is automatically measured by the apparatus 10. In step 264, based on the liquid level from step 260, the coefficients for a calibration curve dependent on the liquid level are looked up, such as the slope and intercept coefficients from FIGS. 6 and 7. In step 268, the burst for the required drop volume is automatically calculated from the coefficients obtained in step 264, such as by using Equation 1: Required burst=(slope)(desired drop vol.)+intercept. Finally, in step 272 the required number of drops having the correct drop volume are dispensed by an acoustic dispensing apparatus, such as the apparatus 10.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method for dispensing drops of a source liquid with a drop dispensing apparatus, the method comprising:
   creating a first burst curve data set that relates a range of liquid levels of the source liquid to a range of burst values for dispensing one or more drops of the source liquid having a first drop volume, the range of burst values being related to a plurality of acoustic waves;
   creating a second burst curve data set that relates the range of liquid levels to the range of burst values for dispensing one or more drops of the source liquid having a second drop volume, where the second drop volume is not equal to the first drop volume;
   creating a first calibration function data set that relates the first drop volume to a first burst value measured at a first liquid level in the first burst curve data set, and that relates the second drop volume to a second burst value measured at the first liquid level in the second burst curve data set;
   creating a second calibration function data set that relates the first drop volume to a third burst value measured at a second liquid level in the first burst curve data set, and that relates the second drop volume to a fourth burst value measured at the second liquid level in the second burst curve data set;
   creating a dispensing data set based on a first coefficient of a first function corresponding to the first calibration function data set and a second coefficient of a second function corresponding to the second calibration function data set;
   calculating, based on the dispensing data set, a first new burst value required to dispense one or more drops of the source liquid having a first new drop volume, where the first new drop volume is different from both the first drop volume and the second drop volume; and
   dispensing, using the drop dispensing apparatus and based on the first new burst value, one or more drops of the source liquid having the first new drop volume.

2. The method of claim 1 wherein the first and second drop volumes are in a range of one nanoliter to 25nl.

3. The method of claim 1 wherein:
   creating the first calibration function data set comprises generating a first equation for a first line having a first slope and a first intercept; and
   creating the second calibration function data set comprises generating a second equation for a second line having a second slope and a second intercept.

4. The method of claim 3 wherein the dispensing data set comprises the first and second slopes and the first and second intercepts as a function of liquid level.

5. The method of claim 1 further comprising:
   creating a plurality of burst curve data sets for a plurality of drop volumes, with each of the plurality of burst curve data sets relating the range of liquid levels to the range of burst values for dispensing one or more drops of the source liquid having a uniform drop volume, and with each of the plurality of burst curve data sets yielding a different uniform drop volume from any other of the plurality of burst curve data sets, the plurality of burst curve data sets being in addition to the first and second burst curve data sets for the first and second drop volumes.

6. The method of claim 5 wherein the plurality of drop volumes, and the first and second drop volumes, are all in a range of 1nl to 25nl.

7. The method of claim 5 further comprising:
creating a plurality of calibration function data sets that relate the plurality of drop volumes to a plurality of burst values measured at a plurality of liquid levels in the plurality of burst curve data sets, and where each of the plurality of calibration data sets is measured at a different liquid level in the plurality of liquid levels, the plurality of calibration function data sets being in addition to the first calibration function data set and the second calibration function data set.

8. The method of claim 7 wherein:
creating the plurality of calibration function data sets comprises generating a plurality of equations for a plurality of polynomials having a degree higher than one; and
creating the first and second calibration function data sets comprises generating a first and a second equation for a first and a second polynomial having degrees higher than one.

9. The method of claim 8 wherein the plurality of polynomials, and the first and second polynomials, are used in creating the dispensing data set.

10. The method of claim 1 wherein the one or more drops are dispensed using acoustic energy.

11. The method of claim 1 wherein the first coefficient comprises a slope of the first function and the second coefficient comprises a slope of the second function.

12. The method of claim 1 wherein the first coefficient comprises an intercept of the first function and the second coefficient comprises an intercept of the second function.

13. The method of claim 1 wherein the first coefficient comprises a slope of the first function and the second coefficient comprises a slope of the second function, and wherein the dispensing data set is further based on:
a third coefficient comprising an intercept of the first function; and
a fourth coefficient comprising an intercept of the second function.

14. The method of claim 1 wherein calculating the first new burst value comprises:
determining a first coefficient of the dispensing data set based on a first new liquid level; and
calculating the first new burst value based on the first coefficient and the first new drop volume.

15. The method of claim 14 wherein determining the first coefficient of the dispensing data comprises interpolating between the first coefficient of the first function and the second coefficient of the second function.

16. The method of claim 15 wherein the first coefficient of the first function comprises a slope of the first function and the second coefficient of the second function comprises a slope of the second function.

* * * * *